(12) United States Patent
Levitt et al.

(10) Patent No.: US 12,534,690 B2
(45) Date of Patent: Jan. 27, 2026

(54) CLEANING COMPOSITIONS AND METHODS OF USE

(71) Applicant: Ecolab USA Inc., St. Paul, MN (US)

(72) Inventors: Mark Levitt, West St. Paul, MN (US); Meghan Gadbois, Hugo, MN (US); Altony Miralles, Woodbury, MN (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 17/825,153

(22) Filed: May 26, 2022

(65) Prior Publication Data

US 2022/0372402 A1 Nov. 24, 2022

Related U.S. Application Data

(63) Continuation of application No. 15/686,871, filed on Aug. 25, 2017, now Pat. No. 11,370,997.

(Continued)

(51) Int. Cl.
| | |
|---|---|
| *C11D 3/33* | (2006.01) |
| *B08B 3/08* | (2006.01) |
| *C11D 1/24* | (2006.01) |
| *C11D 1/66* | (2006.01) |
| *C11D 1/72* | (2006.01) |

(Continued)

(52) U.S. Cl.
CPC ................ *C11D 3/33* (2013.01); *B08B 3/08* (2013.01); *C11D 1/24* (2013.01); *C11D 1/72* (2013.01); *C11D 1/83* (2013.01); *C11D 1/88* (2013.01); *C11D 1/90* (2013.01); *C11D 3/1206* (2013.01);

(Continued)

(58) Field of Classification Search
None
See application file for complete search history.

(56) References Cited

U.S. PATENT DOCUMENTS

| | | |
|---|---|---|
| 2,674,619 A | 4/1954 | Lundsted |
| 2,677,700 A | 5/1954 | Jackson et al. |

(Continued)

FOREIGN PATENT DOCUMENTS

| | | |
|---|---|---|
| CA | 2143558 A1 | 8/1996 |
| CN | 102492571 A | 6/2012 |

(Continued)

OTHER PUBLICATIONS

JP 5957198 English Translation, accessed on Jan. 2023. (Year: 2016).*

(Continued)

*Primary Examiner* — Kaj K Olsen
*Assistant Examiner* — Arlyn I Rivera-Cordero
(74) *Attorney, Agent, or Firm* — Merchant & Gould P.C.

(57) ABSTRACT

A composition comprises from 0.1 to 30 wt-% of one or more amino acids, 0.1 to 30 wt-% of one or more surfactants, and optionally one or more hydrotropes. The amino acids may be selected from arginine ("ARG"), lysine ("LYS"), histidine ("HIS"), glycine ("GLY"), or combinations thereof. The composition can be formulated as a cleaning composition, such as a hard surface cleaner, a floor cleaner, or a degreaser. The composition can be used in a method for treating a surface, where the composition is applied to the surface and allowed to remain on the surface for a length of time, and the surface is then wiped.

12 Claims, 1 Drawing Sheet

Related U.S. Application Data

(60) Provisional application No. 62/379,518, filed on Aug. 25, 2016.

(51) Int. Cl.
*C11D 1/83* (2006.01)
*C11D 1/88* (2006.01)
*C11D 1/90* (2006.01)
*C11D 3/12* (2006.01)
*C11D 3/34* (2006.01)

(52) U.S. Cl.
CPC ............ *C11D 3/3418* (2013.01); *C11D 1/662* (2013.01); *C11D 2111/14* (2024.01)

(56) References Cited

U.S. PATENT DOCUMENTS

| | | | |
|---|---|---|---|
| 2,903,486 | A | 9/1959 | Brown et al. |
| 3,048,548 | A | 8/1962 | Martin et al. |
| 3,382,178 | A | 5/1968 | Lissant et al. |
| 3,554,790 | A | 1/1971 | Gehman et al. |
| 3,948,818 | A | 4/1976 | Tomiyama et al. |
| 4,565,647 | A | 1/1986 | Llenado |
| 5,573,702 | A | 11/1996 | Bonnechere et al. |
| 5,741,817 | A | 4/1998 | Chowhan et al. |
| 5,935,920 | A | 8/1999 | Geke et al. |
| 6,207,631 | B1 * | 3/2001 | Kasturi ................ C11D 3/3765 510/237 |
| 6,548,458 | B2 | 4/2003 | Loper |
| 7,247,607 | B2 | 7/2007 | Choi |
| 11,370,997 | B2 | 6/2022 | Levitt et al. |
| 2004/0029757 | A1 | 2/2004 | Levitt et al. |
| 2004/0058847 | A1 | 3/2004 | Morschhauser et al. |
| 2004/0154640 | A1 | 8/2004 | Smith et al. |
| 2007/0021316 | A1 | 1/2007 | Dilley et al. |
| 2007/0179079 | A1 | 8/2007 | Kilkenny et al. |
| 2008/0274933 | A1 | 11/2008 | Fernholz et al. |
| 2013/0252875 | A1 | 9/2013 | Merces |
| 2013/0303425 | A1 * | 11/2013 | Scialla ................ C11D 1/38 134/25.2 |

FOREIGN PATENT DOCUMENTS

| | | | |
|---|---|---|---|
| CN | 103834492 A | 6/2014 | |
| CN | 104152282 A | 11/2014 | |
| EP | 2305785 A1 | 4/2011 | |
| JP | 50-6605 | 1/1975 | |
| JP | 6-501730 A | 2/1994 | |
| JP | 09030938 | 2/1997 | |
| JP | 09095478 | 4/1997 | |
| JP | 10001693 | 1/1998 | |
| JP | 10-36887 A | 2/1998 | |
| JP | 11-315300 A | 11/1999 | |
| JP | 2004035816 | 2/2004 | |
| JP | 2011-132511 A | 7/2011 | |
| JP | 2013-108048 A | 6/2013 | |
| JP | 2014-172964 A | 9/2014 | |
| JP | 5957198 B2 * | 7/2016 | ............... C11D 1/29 |
| MX | PA03003711 * | 7/2005 | ............... C11D 1/00 |
| WO | 92/06157 A1 | 4/1992 | |
| WO | 01/21209 A1 | 3/2001 | |
| WO | 2012/067962 A1 | 5/2012 | |

OTHER PUBLICATIONS

MXPA03003711 English translation, accessed on Aug. 2023. (Year: 2005).*
International Search Report and Written Opinion for PCT/US2017/048684, dated Nov. 6, 2017, 13 Pages.
"Surfactant Encyclopedia," Cosmetics & Toiletries, vol. 104, pp. 71-86 (Feb. 1989).

* cited by examiner

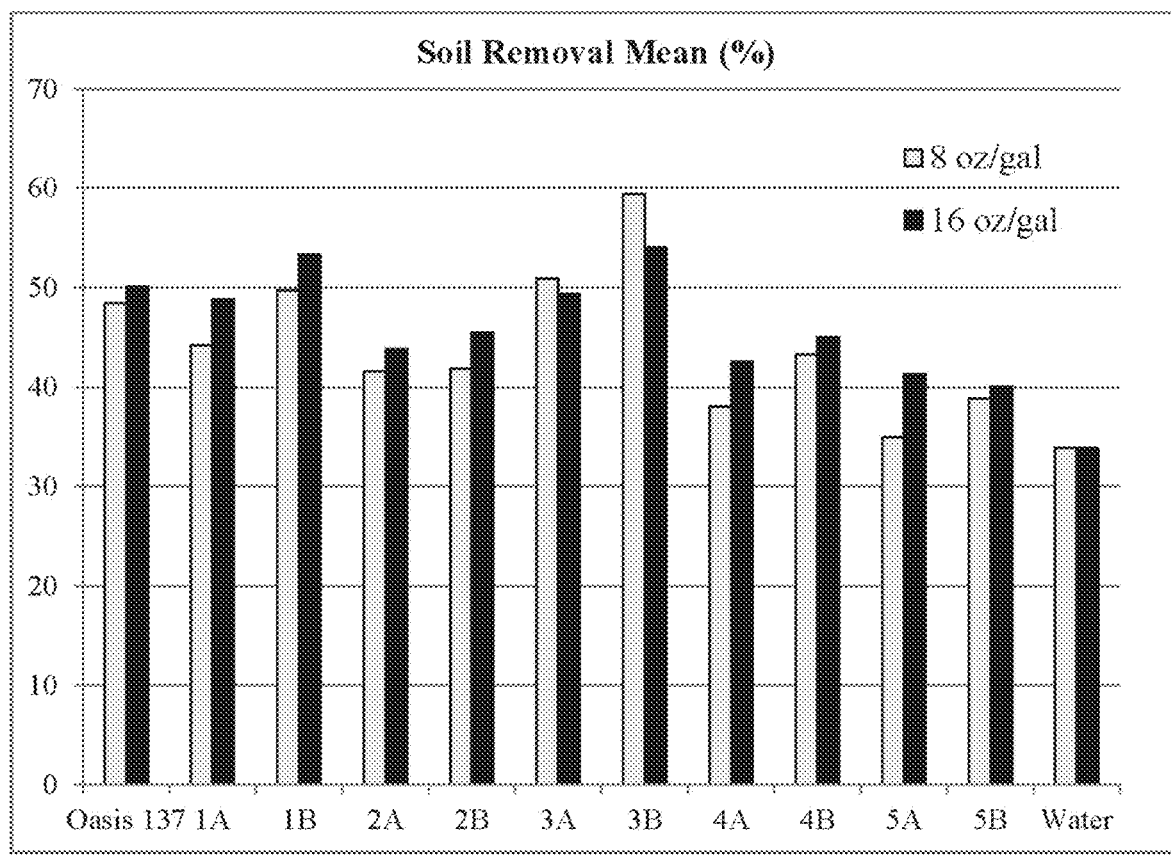

CLEANING COMPOSITIONS AND METHODS OF USE

CROSS REFERENCE TO RELATED APPLICATIONS

This application is a continuation of U.S. application Ser. No. 15/686,871, filed Aug. 25, 2017, now U.S. Pat. No. 11,370,997, issued Jun. 28, 2022, entitled "Cleaning Compositions and Methods of Use," which claims the benefit of U.S. Provisional Application No. 62/379,518, filed Aug. 25, 2016, entitled "Cleaning Compositions and Methods of Use," the disclosures of which is are incorporated by reference herein in their entirety.

FIELD

The present disclosure relates to raw material replacements for alkanolamines and their use in industrial chemical compositions including cleaning compositions for cleaning hard surfaces. In particular, the disclosed compositions can be formulated for increased safety and reduced irritation, sensitization, or respiratory effects.

BACKGROUND

Alkanolamines are a class of raw materials that include monoethanolamine ("MEA"), diethanolamine ("DEA"), triethanolamine ("TEA"), and aminomethylpropanol (e.g., 2-amino-2-methyl-1-propanol, available as AMP™ from Angus Chemical Company in Buffalo Grove, IL). Alkanolamines are used in chemical compositions to provide alkalinity, neutralize acidic raw materials, and serve as swelling agents or penetrating agents. When used in cleaning compositions, alkanolamines are capable of penetrating into soil and grease, making them easier to remove. Alkanolamines can therefore be useful, for example, in general purpose cleaners and degreaser compositions. Alkanolamines can also be used to neutralize synthetic anionic surfactant acids (e.g., linear alkylbenzene sulfonates ("LAS") or dodecylbenzenesulfonic acid ("DDBSA")), neutralize fatty acids to create amino soaps, to complex metals, or to provide cleaning activity in the absence of anionic surfactants. Alkanolamines can further be useful for stabilizing thickened compositions. Alkanolamines can also be used in compositions for cleaning, polishing or stripping coatings on floors because they react with cross-linked acrylics in the floor finish and cause swelling or softening of the acrylic polymers, making polishing of the floor after cleaning more effective.

While being highly useful in cleaning compositions for many reasons, exposure to alkanolamines may cause sensitivity, irritation, and respiratory symptoms. Some short-chain amines are also not preferred by certain environmental certifying agencies and programs, such as the U.S. EPA Safer Choice and Green Seal. It would therefore be beneficial to provide a replacement for alkanolamines in cleaning compositions.

It is against this background that the present disclosure is made.

SUMMARY

The present disclosure relates to a composition comprising 1 to 30 wt-% of one or more amino acids, 0.1 to 30 wt-% of one or more surfactants, and optionally one or more hydrotropes. The amino acids may be selected from arginine ("ARG"), lysine ("LYS"), histidine ("HIS"), glycine ("GLY"), or combinations thereof. The composition can be formulated as a cleaning composition, such as a hard surface cleaner, a floor cleaner, a floor cleaner conditioner, or a degreaser. The present disclosure further relates to a method for treating a surface with the composition, the method comprising applying the composition to the surface, allowing the composition to remain on the surface for a length of time, and wiping the surface.

BRIEF DESCRIPTION OF FIGURES

FIG. 1 is a graphical representation of the results of Example 2.

DETAILED DESCRIPTION

"Alkanolamines" are compounds that include both a hydroxyl group (—OH) and an amino group (—$NH_2$, —NHR, or —$NR^1R^2$) on an alkane backbone.

"Amino acids" are acids that generally contain a carboxylic acid group (—COOH) and an amine (—$NH_2$) on an alkyl backbone. Examples of amino acids include arginine ("ARG"), lysine ("LYS"), histidine ("HIS"), aspartic acid ("ASP"), glutamic acid ("GLU"), serine ("SER"), threonine ("THR"), asparagine ("ASN"), glutamine ("GLN"), cysteine ("CYS"), glycine ("GLY"), proline ("PRO"), alanine ("ALA"), valine ("VAL"), isoleucine ("ILE"), leucine ("LEU"), methionine ("MET"), phenylalanine ("PHE"), tyrosine ("TYR"), and tryptophan ("TRP"). Many more amino acids are known to exist.

"Degreasers" are compositions used for removing grease, and may be capable of removing polymerized grease or polymerized cooking oil from surfaces. Degreasers differ from normal detergents in that they are capable of removing thermally degraded, polymerized soils from surfaces. Such soils include polymerized fats, oils, proteins, and sugars.

The terms "stripper" and "floor polish stripper" are used here to refer to compositions that are used for removing floor polish compounds.

The term "floor cleaner conditioner" is used here to refer compositions that soften or otherwise prepare floor polish compounds to enhance subsequent burnishing, buffing, or recoating of the floor.

The term "surface" is used here to refer to soft surfaces, such as fabric surfaces and articles, textiles, and fibers; and hard surfaces, such as floors, windows, walls, furniture, countertops, appliances, instruments, etc., that may be covered by metal, plastic, glass, tile, stone, hard plastics, or other hard surface materials. The term "surface" is not intended to cover human skin.

The term "use solution" is used here to refer to a composition having a concentration of active ingredients that is ready to be used as-is without further dilution.

The term "water soluble" is used to refer to compounds that are freely soluble or very soluble in water and have a solubility of 10 g per 100 mL or greater. "Substantially water soluble" is used to refer to compounds that have a solubility of about 3 to 10 g per 100 mL. "Somewhat water soluble" is used to refer to compounds that are sparingly soluble or slightly soluble in water and have a solubility of about 0.01 to 3 g per 100 mL. "Insoluble" is used to refer to compounds that are not soluble in water or that have a solubility of less than 0.01 g per 100 mL.

"Miscible" is used to refer to liquids that are capable of forming a homogenous solution at any ratio.

The term "about" is used here to include normal variations in measurements as expected by persons skilled in the art, and is understood have the same meaning as "approximately" and to cover a typical margin of error, such as ±5% of the stated value.

The transitional phrase "consisting essentially of" as used in the claims limits the scope of the claim to the specified materials including only minor impurities or inactive agents that a person of ordinary skill in the relevant art would ordinarily associate with the composition.

The present disclosure relates to the use of amino acids as a replacement for alkanolamines in chemical compositions including cleaning compositions and degreasers for treating or cleaning surfaces, and floor cleaners, floor cleaner conditioners, polishers, and floor finish strippers. The present disclosure relates to a composition comprising 0.1 to 30 wt-% of one or more amino acids, 0.1 to 30 wt-% of one or more surfactants, and optionally one or more hydrotropes. The amino acids may be selected from arginine ("ARG"), lysine ("LYS"), histidine ("HIS"), glycine ("GLY"), or combinations thereof. The present disclosure further relates to compositions formulated for reduced respiratory irritation, skin irritation, sensitization, and other negative effects. The compositions can be formulated as cleaning compositions, such as a hard surface cleaner, a floor cleaner, or a degreaser. The disclosed compositions can be provided as concentrated formulations that can be diluted to form a use solution. Alternatively the composition can be provided as a ready-to-use solution. A concentrate refers to a product that is diluted to form a use solution before it is applied to a surface. A use solution refers to a product that is applied to a surface either directly or by the use of an applicator. The present disclosure further relates to a method for treating a surface with the composition, the method comprising applying the composition to the surface, allowing the composition to remain on the surface for a length of time, optionally scrubbing or agitating the solution on the surface and removing the solution and soil by wiping, vacuuming, rinsing, or the like.

Composition

The compositions of the present disclosure utilize one or more amino acids as a replacement for alkanolamines. The inventors of the present compositions have found that certain amino acids are capable of providing similar or improved properties (e.g., a similar or improved alkalinity, neutralizing, pH, softening, cleaning, and/or removal effects) as alkanolamines, while reducing the risk of respiratory irritation sometimes associated with alkanolamines. In some embodiments, the compositions are free of alkanolamines. In some embodiments, the compositions are substantially free of alkanolamines. In some embodiments, the compositions may contain some amount of alkanolamines, for example, less than about 20 wt-%, less than about 5 wt-% or less than about 1 wt-%.

The composition comprising amino acids may be formulated for various uses, including cleaning, degreasing, floor polishing, floor finish removing, etc. The composition may be particularly useful in domestic, industrial and institutional applications such as general purpose cleaners that are effective at cleaning various substrates and surfaces, such as floors, equipment (e.g., food and beverage processing equipment, grain processing equipment, and the like), food preparation surfaces (e.g., counter tops, cutting boards, and other surfaces), and other hard surfaces. The compositions can also be used to clean surfaces in healthcare facilities such as hospitals, clinics, and long-term care facilities. The compositions can also be effective at cleaning floors treated with an acrylic-based polish. The compositions can be effective at softening and removing floor finishes. The compositions can be formulated as degreasers that are effective at removing polymerized grease, including animal and vegetable fats and non-trans fats, and other soils from floors and other surfaces. The use solution is useful for cleaning floors in retail and warehouse stores, commercial kitchens of full service and quick service restaurants, and is effective on a variety of types of flooring materials, including quarry tile and concrete. The solution is also useful for removing a variety of soils from surfaces and articles including textiles, and may be used in cleaning (e.g., hard surface cleaning), dishwashing, and laundry applications.

The composition may be formulated as a liquid, a foam, a thickened liquid, or a solid. For example, a concentrate composition can be formulated as a solid, e.g., a powder, block, tablet, pellet, granule, etc. The composition can further be formulated as a concentrate, or as a use solution.

According to an embodiment, the composition comprises one or more suitable amino acids. The amino acids can be selected from, for example, LYS, ARG, GLY, or HIS, or combinations thereof. The composition may comprise alpha amino acids. In some embodiments the amino acids are proteinogenic amino acids. In some embodiments the amino acids are proteinogenic, non-proteinogenic, or a combination thereof. In preferred embodiments, the amino acids are selected so that the composition provides effective cleaning and/or polish preparation qualities, while exhibiting reduced respiratory implications (e.g., reduced respiratory irritation and/or sensitization). For example, the amino acids may be selected to act as penetrants, swelling agents, or to enhance cleaning or to neutralize alkalinity. In some embodiments, the amino acid can be selected based on its pKa, such that the pKa of the amino acid is above the pH of the composition. If the amino acid has two amino groups, it may be desirable that the pKa of both amino groups is above the pH of the composition. For example, the pKa of the second amino group in lysine is about 10.7, and in arginine about 12.1. Glycine has a pKa of about 9.8. These amino acids may therefore be most useful in compositions that are moderately alkaline (e.g., have a pH from 7 to about 10). In other cases, such as floor strippers or alkaline degreasers, pH of the composition can be higher than one or both the pKas. The composition (including optional additional components) can be formulated to provide optimal efficiency based on the amino acid(s) selected.

The composition can be provided as an aqueous solution or as a concentrate that can be diluted with an aqueous diluent to prepare a use-solution. The composition may also include other solvents in addition to, or instead of water. In some embodiments the composition comprises water soluble or substantially water soluble amino acids. If the composition comprises non-water soluble or slightly water soluble amino acids, the composition may also include one or more solubilizers.

In addition to the amino acid or blend of amino acids and any solubilizers, the compositions can be formulated with additional functional ingredients that lend themselves to the desired application. The composition may comprise additional components to provide desired properties or functionality. For example, the amino acids can be formulated together with surfactants, chelating or sequestering agents, pH modifiers (acids or bases), hydrotropes, sanitizers or antimicrobial agents, organic solvents, dyes, fragrances, enzymes, rheological modifiers (e.g., gelling agents, thickeners, and the like), preservatives, processing aids, corrosion inhibitors, or other functional ingredients. If the composition is formulated as a solid concentrate, the formulation may further include builders or fillers, solidifying agents, and hardening agents.

Surfactants

According to an embodiment, the composition comprises one or more surfactants. The surfactant can be selected based on the planned use of the formulation. For example, in some applications, such as floor cleaning, non-foaming or low foaming surfactants may be desirable. Alternatively, the composition can include a foaming surfactant and a defoamer. In other examples, the composition is formulated as a foam, a foaming liquid, or a solid that can be dissolved and/or diluted to form a foaming liquid. A foam composition may be desirable, for example, as a general purpose cleaner, a manual dish washing detergent, or a degreaser. A foam composition can be formulated with a foaming surfactant, such as a foaming anionic surfactant. Suitable surfactants include nonionic, cationic, anionic, amphoteric, and zwitterionic surfactants and their combinations. In some embodiments, a co-surfactant is also included in the composition.

In some embodiments, the composition is formulated with an anionic or amphoteric surfactant. For example, the surfactant may comprise a sulfonate, sulfate, or an amine oxide. The composition may also be formulated without certain surfactants, such as fatty acid surfactants.

The amino acid may be used as a cleaner or to enhance the cleaning action of a surfactant, and/or to neutralize acidic components, such as an acidic surfactant. An example of a commonly used acidic surfactant that can be neutralized with an amino acid is LAS (linear alkylbenzene sulfonic acid). The amino acid may also improve the cleaning efficacy of LAS. In some embodiments, the amino acid is not present as part of a surfactant salt. The surfactant and amino acid are separate components, but their combination provides a synergistic effect, particularly when nonionic surfactants are used.

Anionic Surfactants. Anionic surfactants are useful as detersive surfactants and foaming surfactants, but also as gelling agents or as part of a gelling or thickening system, as solubilizers, and for hydrotropic effect and cloud point control. The composition may include one or more anionic surfactants. Suitable anionic surfactants for the present composition include: carboxylic acids and their salts, such as alkanoic acids and alkanoates, ester carboxylic acids (e.g. alkyl succinates), ether carboxylic acids, and the like; phosphoric acid esters and their salts; sulfonic acids and their salts, such as isethionates, alkylaryl sulfonates, alkyl sulfonates, ester sulfonates, sulfosuccinates; and sulfuric acid esters and their salts, such as alkyl ether sulfates, alkyl sulfates, and the like.

Anionic surfactants includes those with a negative charge on the hydrophilic group or surfactants in which the molecule carries no charge unless pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. The particular salts will be suitably selected depending upon the needs of the particular formulation. In some cases, lysine will act as the counter ion.

Anionic surfactants are excellent detersive surfactants and typically have high foam profiles. Anionic surfactants can also be useful to impart special chemical or physical properties other than detergency within the composition. Anionics can be employed as gelling agents or as part of a gelling or thickening system. Anionics are also excellent solubilizers and can be used for hydrotropic effect and cloud point control.

The majority of large volume commercial anionic surfactants can be subdivided into five major chemical classes and additional sub-groups known to those of skill in the art and described in "Surfactant Encyclopedia," *Cosmetics & Toiletries*, Vol. 104 (2) 71-86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes phosphoric acid esters and their salts. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Exemplary anionic surfactants include the following:

Linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside (the nonionic nonsulfated compounds being described herein).

Ammonium and substituted ammonium (such as mono-, di- and triethanolamine) and alkali metal (such as sodium, lithium and potassium) salts of the alkyl mononuclear aromatic sulfonates such as the alkyl benzene sulfonates containing from 5 to 18 carbon atoms in the alkyl group in a straight or branched chain, e.g., the salts of alkyl benzene sulfonates or of alkyl toluene, xylene, cumene and phenol sulfonates; alkyl naphthalene sulfonate, diamyl naphthalene sulfonate, and dinonyl naphthalene sulfonate and alkoxylated derivatives.

Anionic carboxylate surfactants such as alkyl ethoxy carboxylates, the alkyl polyethoxy polycarboxylate surfactants and the soaps (e.g. alkyl carboxylates). Secondary soap surfactants (e.g. alkyl carboxyl surfactants) include those which contain a carboxyl unit connected to a secondary carbon. The secondary carbon can be in a ring structure, e.g. as in p-octyl benzoic acid, or as in alkyl-substituted cyclohexyl carboxylates. The secondary soap surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present.

Other anionic surfactants include olefin sulfonates, such as long chain alkene sulfonates, long chain hydroxyalkane sulfonates or mixtures of alkenesulfonates and hydroxyalkane-sulfonates. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). Resin acids and hydrogenated resin acids are also suitable, such as rosin, hydrogenated rosin, and resin acids and hydrogenated resin acids present in or derived from tallow oil.

When hard water may be present as the water-of-dilution, surfactants with carboxylic acid such as soap may be avoided.

Nonionic Surfactants. In some embodiments, the surfactant comprises a nonionic surfactant. Nonionic surfactants improve soil removal and can reduce the contact angle of the solution on the surface being treated.

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Examples of suitable nonionic surfactants include: block polyoxypropylene-polyoxyethylene polymeric compounds, including commercially available products PLURONIC® and TETRONIC® manufactured by BASF Corp. in Florham Park, NJ; condensation products of alkyl phenol with ethylene oxide, including commercially available products IGEPAL® manufactured by Solvay S.A. and TRITON® manufactured by Dow Chemical; condensation products of a straight or branched chain alcohol having from 6 to 24 carbon atoms with ethylene oxide, including commercially available products NEODOL® manufactured by Shell Chemical Co. and ALFONIC® manufactured by Sasol Limited; condensation products of straight or branched chain carboxylic acid with ethylene oxide, including commercially available products NOPALCOL® manufactured by Henkel Corporation and LIPOPEG® manufactured by Lipo Chemicals, Inc.; and alkanoic acid esters formed by reaction with glycerides, glycerin, and polyhydric alcohols.

Alkoxylated (e.g., ethoxylated or propoxylated) $C_6$-$C_{18}$ fatty alcohols are suitable surfactants for use in the present compositions. An example of a suitable alkoxylated alcohol is ethoxylated C10 alcohol, commercially available as LUTENSOL XP® from BASF Corp., in Florham Park, NJ.

Exemplary nonionic surfactants further include the following:

Block polyoxypropylene-polyoxyethylene polymeric compounds based upon propylene glycol, ethylene glycol, glycerol, trimethylolpropane, and ethylenediamine as the initiator reactive hydrogen compound, such as: difunctional block copolymers (PLURONIC® products available from BASF Corp.); and tetra-functional block copolymers (TETRONIC® products available from BASF Corp.)

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Commercially available examples include IGEPAL® available from Solvay S.A., and TRITON® available from the DOW Chemical Company.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Commercially available examples include NEODOL® available from Shell Chemical Co. and ALFONIC® available from Sasol North America, Inc.

Condensation products of one mole of saturated or unsaturated, straight or branched chain carboxylic acid having from about 8 to about 18 carbon atoms with from about 6 to about 50 moles of ethylene oxide. The acid can be a mixture of acids in the above-defined carbon atoms range or it can be an acid having a specific number of carbon atoms within the range. Commercially available examples include LIPOPEG® available from Lipo Chemicals, Inc.

Alkanoic acid esters formed by reaction with glycerides, glycerin, and polyhydric (saccharide or sorbitan/sorbitol) alcohols. All of these ester moieties have one or more reactive hydrogen sites on their molecule which can undergo further acylation or ethylene oxide (alkoxide) addition to control the hydrophilicity of these substances.

In some embodiments the composition comprises low-foaming nonionic surfactants. Exemplary low-foaming nonionic surfactants include:

Reverse block copolymers which are block copolymers, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. Also included are di-functional reverse block copolymers (commercially available as PLURONIC® R from BASF Corp.) and tetra-functional reverse block copolymers (commercially available as TETRONIC® R from BASF Corp.)

Capped nonionic surfactants which are modified by "capping" or "end blocking" the terminal hydroxy group or groups (of multifunctional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

The alkylphenoxypolyethoxyalkanols of U.S. Pat. No. 2,903,486 issued Sep. 8, 1959 to Brown et al. and represented by the formula:

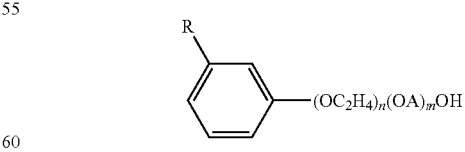

where R is an alkyl group of 8 to 9 carbon atoms; A is an alkylene chain of 3 to 4 carbon atoms; n is an integer of 7 to 16; and m is an integer of 1 to 10.

Polyalkylene glycol condensates described in U.S. Pat. No. 3,048,548 issued Aug. 7, 1962 to Martin et al., having alternating hydrophilic oxyethylene chains and hydrophobic oxypropylene chains where the weight of the terminal hydrophobic chains, the weight of the middle hydrophobic unit and the weight of the linking hydrophilic units each representing about one-third of the condensate.

Defoaming nonionic surfactants disclosed in U.S. Pat. No. 3,382,178 issued May 7, 1968 to Lissant et al. having the general formula Z[(OR)$_n$ OH]$_z$, where Z is an alkoxylatable material; R is a radical derived from an alkaline oxide which can be ethylene and propylene; n is an integer from 10 to 2,000 or more; and z is an integer determined by the number of reactive oxyalkylatable groups. Examples of commercially available defoaming or low foaming nonionic surfactants include LUTENSOL® and PLURAFAC®, both available from BASF Corp.

Conjugated polyoxyalkylene compounds described in U.S. Pat. No. 2,677,700, issued May 4, 1954 to Jackson et al. corresponding to the formula Y(C$_3$H$_6$O)$_n$(C$_2$H$_4$O)$_m$H where Y is the residue of organic compound having from about 1 to 6 carbon atoms and one reactive hydrogen atom; n is an average value of at least about 6.4, as determined by hydroxyl number; and m is a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula Y[(C$_3$H$_6$O$_n$(C$_2$H$_4$O)$_m$H]$_x$ where Y is the residue of an organic compound having from about 2 to 6 carbon atoms and containing x reactive hydrogen atoms where x has a value of at least about 2; n is a value such that the molecular weight of the polyoxypropylene hydrophobic base is at least about 900; and m is a value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents correspond to the formula: P[(C$_3$H$_6$O)$_n$(C$_2$H$_4$O)$_m$H]$_x$ where P is the residue of an organic compound having from about 8 to 18 carbon atoms and containing x reactive hydrogen atoms where x has a value of 1 or 2; n is a value such that the molecular weight of the polyoxyethylene portion is at least about 44; and m is a value such that the oxypropylene content of the molecule is from about 10% to about 90% by weight. In either case the oxypropylene chains may optionally contain small amounts of ethylene oxide and the oxyethylene chains may also optionally contain small amounts of propylene oxide.

Other conjugated polyoxyalkylene surface-active agents sometimes described as extended surfactants correspond to the formula: P(C$_3$H$_6$O)$_n$(C$_2$H$_4$O)$_m$H where P is the residue of an organic compound having from about 8 to 18 carbon atoms and containing x reactive hydrogen atoms where x has a value of 1 or 2; n has a value of 1-20; and m has a value of 1-20. An example is the LUTENSOL XL series from BASF.

Polyhydroxy fatty acid amide surfactants include those having the structural formula R$^2$CONR$^1$Z where R$^1$ is H, C$_1$-C$_4$ hydrocarbyl, 2-hydroxy ethyl, 2-hydroxy propyl, ethoxy, propoxy group, or a mixture thereof; R$^2$ is a C$_5$-C$_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

Alkyl ethoxylate condensation products of aliphatic alcohols with from about 0 to about 25 moles of ethylene oxide. The alkyl chain of the aliphatic alcohol can either be straight or branched, primary or secondary, and generally contains from 6 to 22 carbon atoms.

Ethoxylated C$_6$-C$_{18}$ fatty alcohols and C$_6$-C$_{18}$ mixed ethoxylated and propoxylated fatty alcohols. Suitable ethoxylated fatty alcohols include the C$_{10}$-C$_{18}$ ethoxylated fatty alcohols with a degree of ethoxylation of from 3 to 50.

Nonionic alkylpolysaccharide surfactants include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units. Similar functionality can be achieved by glueamide surfactants, such as GLUCOPURE products available from Clariant.

Fatty acid amide surfactants include those having the formula R$^6$CON(R$^7$)$_2$ where R$^6$ is an alkyl group containing from 7 to 21 carbon atoms; and each R$^7$ is independently hydrogen, C$_1$-C$_4$ alkyl, C$_1$-C$_4$ hydroxyalkyl, or —(C$_2$H$_4$O)$_x$H, where x is from 1 to 3.

Another class of nonionic surfactants include the class defined as alkoxylated amines or, most particularly, alcohol alkoxylated/aminated/alkoxylated surfactants. These nonionic surfactants may be at least in part represented by the general formulae: R$^{20}$—(PO)$_s$N-(EO)$_t$H, R$^{20}$—(PO)$_s$N-(EO)$_t$H(EO)$_u$H, and R$^{20}$—N(EO)$_t$H; where R$^{20}$ is an alkyl, alkenyl or other aliphatic group, or an alkyl-aryl group of from 8 to 20, preferably 12 to 14 carbon atoms, EO is oxyethylene, PO is oxypropylene, s is 1-20, preferably 2-5, t is 1-10, preferably 2-5, and u is 1-10, preferably 2-5.

Other variations on the scope of these compounds may be represented by the alternative formula R$^{20}$—(PO)$_v$—N[(EO)$_w$H][(EO)$_z$H], where R$^{20}$ is an alkyl, alkenyl or other aliphatic group, or an alkyl-aryl group of from 8 to 20, preferably 12 to 14 carbon atoms, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. One exemplary chemical of this class includes SURFONIC™ PEA 25 Amine Alkoxylate.

The composition may further comprise semi-polar nonionic surfactants. Examples of semi-polar nonionic surfactants include:

Amine oxides are tertiary amine oxides corresponding to the general formula:

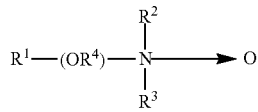

where the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants can be selected from coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl) dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Semi-polar nonionic surfactants also include the water soluble phosphine oxides having the following structure:

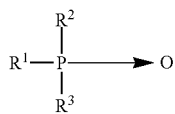

where the arrow is a conventional representation of a semi-polar bond; $R^1$ is an alkyl, alkenyl or hydroxyalkyl moiety ranging from 10 to about 24 carbon atoms in chain length; and $R^2$ and $R^3$ are each alkyl moieties separately selected from alkyl or hydroxyalkyl groups containing 1 to 3 carbon atoms. Examples of useful phosphine oxides include dimethyldecylphosphine oxide, dimethyltetradecylphosphine oxide, methylethyltetradecyl-phosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants also include the water soluble sulfoxide compounds which have the structure:

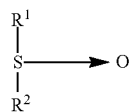

where the arrow is a conventional representation of a semi-polar bond; $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms. Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Cationic Surfactants. A commonly used group of cationic surfactants is amines, such as alkylamines and amido amines. The composition may comprise cationic surfactants, selected either from the amino group, or from other cationic surfactants. The amine group includes, for example, alkylamines and their salts, alkyl imidazolines, ethoxylated amines, and quaternary ammonium compounds and their salts. Other cationic surfactants include sulfur (sulfonium) and phosphorus (phosphonium) based compounds that are analogous to the amine compounds.

Cationic surfactants generally refer to compounds containing at least one long carbon chain hydrophobic group and at least one positively charged nitrogen. The long carbon chain group may be attached directly to the nitrogen atom by simple substitution; or indirectly by a bridging functional group or groups in so-called interrupted alkylamines and amido amines. Such functional groups can make the molecule more hydrophilic or more water dispersible, more easily water solubilized by co-surfactant mixtures, or water soluble. For increased water solubility, additional primary, secondary or tertiary amino groups can be introduced or the amino nitrogen can be quarternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn as:

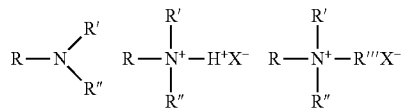

in which, R represents a long alkyl chain, R', R", and R'" may be either long alkyl chains or smaller alkyl or aryl groups or hydrogen and X represents an anion.

The majority of large volume commercial cationic surfactants can be subdivided into four major classes and additional sub-groups known to those of skill in the art and described in "Surfactant Encyclopedia," Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties including detergency in compositions of or below neutral pH, antimicrobial efficacy, thickening or gelling in cooperation with other agents, and the like.

Exemplary cationic surfactants include those having the formula $R^1mR^2{}_xY_LZ$ wherein each $R_1$ is an organic group containing a straight or branched alkyl or alkenyl group optionally substituted with up to three phenyl or hydroxy groups and optionally interrupted by up to four of the following structures:

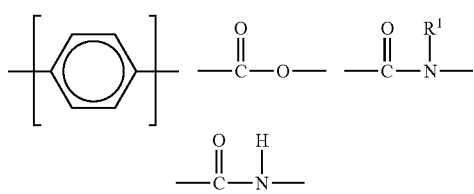

or an isomer or mixture of these structures, and which contains from 8 to 22 carbon atoms. The $R^1$ groups can additionally contain up to 12 ethoxy groups; m is a number from 1 to 3. Preferably, no more than one $R^1$ group in a molecule has 16 or more carbon atoms when m is 2, or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y can be a group, such as one of the following:

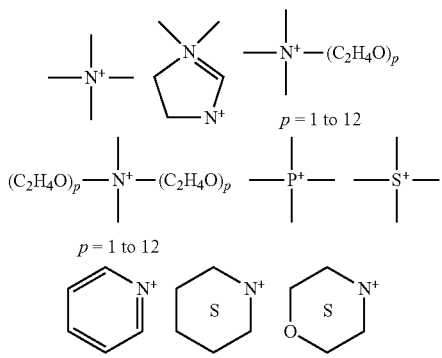

or a mixture thereof. Preferably, L is 1 or 2, with the Y groups being separated by a moiety selected from $R_1$ and $R^2$ analogs (preferably alkylene or alkenylene) having from 1 to 22 carbon atoms and two free carbon single bonds when L is 2. Z is a water soluble anion, such as sulfate, methylsulfate, hydroxide, or nitrate anion, particularly preferred being sulfate or methyl sulfate anions, in a number to give electrical neutrality of the cationic component.

Amphoteric and Zwitterionic Surfactants. Amphoteric and zwitterionic surfactants include derivatives of secondary and tertiary amines, derivatives of heterocyclic secondary and tertiary amines, or derivatives of quaternary ammonium, quaternary phosphonium or tertiary sulfonium compounds. The ammonium, phosphonium, or sulfonium compounds can be substituted with aliphatic substituents, e.g., alkyl, alkenyl, or hydroxyalkyl; alkylene or hydroxy alkylene; or carboxylate, sulfonate, sulfate, phosphonate, or phosphate groups. Betaine and sultaine surfactants are exemplary zwitterionic surfactants for use in the present composition.

Zwitterionic surfactants can be thought of as a subset of amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion, a negative charged carboxyl, sulfate, or sulfonate group, and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants.

A general formula for these compounds is:

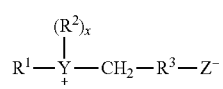

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N, N-di(2-hydroxyethy)-N-octadecylammonio]-butane-1-carboxylate; 5-[S-3-hydroxypropyl-S-hexadecylsulfonio]-3-hydroxypentane-1-sulfate; 3-[P, P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N, N-dimethyl-N-hexadecylammonio)-2-hydroxy-propane-1-sulfonate; 4-[N, N-di(2(2-hydroxyethyl)-N-(2-hydroxydodecyl)ammonio]-butane-1-carboxylate; 3-[S-ethyl-S-(3-dodecoxy-2-hydroxypropyl)sulfonio]-propane-1-phosphate; 3[P,P-dimethyl-P-dodecylphosphonio]-propane-1-phosphonate; and S[N, N-di(3-hydroxypropyl)-N-hexadecylammonio]-2-hydroxy-pentane-1-sulfate. The alkyl groups can be straight or branched and saturated or unsaturated.

Zwitterionic surfactants include betaines and sultaines of the general structure:

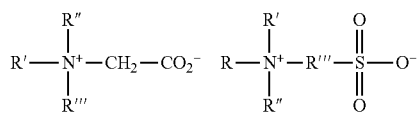

For example, cocamidopropyl betaine has the following structure:

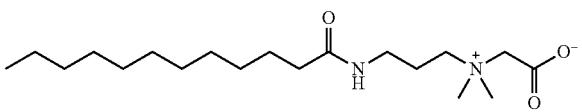

And cocamidopropyl sultaine has the following structure:

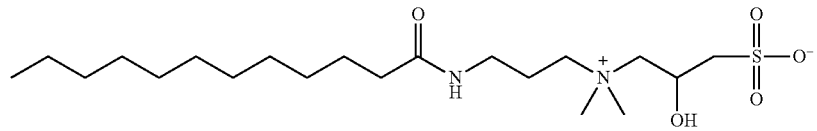

These surfactant betaines typically do not exhibit strong cationic or anionic characters at pH extremes, nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethyl-amido-diethylammonio-1-carboxybutane; $C_{16-18}$ acylamidodimethylbetaine; $C_{12-16}$ acylamidopentane-diethylbetaine; and $C_{12-16}$ acylmethylamidodimethylbetaine.

Sultaines include those compounds having the formula $(R(R^1)_2N^+R^2SO^{3-}$ in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

Amphoteric Surfactants. Amphoteric or ampholytic surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia," Cosmetics & Toiletries, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation, for example with ethyl acetate. During alkylation, one or two carboxy-alkyl groups react to form a tertiary amine and an ether linkage with differing alkylating agents yielding different tertiary amines.

Exemplary commercially available imidazoline-derived amphoterics include: cocoamphopropionate, cocoamphocarboxy-propionate, cocoamphoglycinate, cocoamphocarboxy-glycinate, cocoamphopropyl-sulfonate, and cocoamphocarboxy-propionic acid. Preferred amphocarboxylic acids are produced from fatty imidazolines in which the dicarboxylic acid functionality of the amphodicarboxylic acid is diacetic acid and/or dipropionic acid. The carboxymethylated compounds (glycinates) described here are frequently called betaines.

Long chain N-alkylamino acids are readily prepared by reacting $RNH_2$, in which R is $C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes include alkyl beta-amino dipropionates, $RN(C_2H_4COOM)_2$ and $RNHC_2H_4COOM$. In these, R is preferably an acyclic hydrophobic group containing from 8 to 18 carbon atoms, and M is a cation to neutralize the charge of the anion.

Preferred amphoteric surfactants include those derived from coconut products such as coconut oil or coconut fatty acid. The more preferred of these coconut derived surfactants include as part of their structure an ethylenediamine moiety, an alkanolamide moiety, an amino acid moiety, preferably glycine, or a combination thereof; and an aliphatic substituent of from 8 to 18 (preferably 12) carbon atoms. Such a surfactant can also be considered an alkyl amphodicarboxylic acid. Disodium cocoampho dipropionate is one most preferred amphoteric surfactant and is commercially available under the tradename MIRANOL® FBS from Solvay S.A. Another most preferred coconut derived amphoteric surfactant with the chemical name disodium cocoampho diacetate is sold under the tradename MIRANOL® C2M-SF Conc., also from Solvay S.A.

Surfactant Concentration

The composition may comprise about 0.01 to about 95 wt-%, or about 0.5 to about 40 wt-%, or about 1.0 to about 25 wt-% of surfactants. In some embodiments, the composition comprises about 0.5 to about 30 wt-%, or about 1 to about 20 wt-%, or about 2 to about 15 wt-%, or about 2 to about 10 wt-% surfactant. The surfactant may be a combination of surfactants. In an embodiment, at least one of the surfactants is nonionic. According to an exemplary embodiment, the composition comprises about 0.5-10 wt-% of a non-foaming, nonionic surfactant. According to a further exemplary embodiment, the composition comprises about 1-5 wt-% of alcohol alkoxylate. In another embodiment, at least one of the surfactants is anionic. According to an exemplary embodiment, the composition comprises about 5-15 wt-% of an anionic surfactant, such as a benzene sulfonate. The composition can be further diluted to prepare a use-solution. For example, the composition may be diluted at a ratio of about 1:5, about 1:10, about 1:32, about 1:64, about 1:128, or about 1:512, or any ratio therebetween. If the composition is used as an all-purpose cleaner, a use-solution may include about 0.1 to about 5 wt-%, about 0.2 to about 2 wt-%, or about 0.25 to about 0.75 wt-% surfactants.

Additional Components

The composition may comprise additional components to provide desired properties or functionality. For example, the composition can include chelating or sequestering agents, pH modifiers (acids or bases), hydrotropes, builders, sanitizers, organic solvents, antimicrobial agents, enzymes, dyes, fragrances, rheological modifiers (e.g., gelling agents, thickeners, and the like), preservatives, processing aids, corrosion inhibitors, magnesium ions, or other functional ingredients. If the composition is formulated as a solid concentrate, the formulation may further include fillers, solidifying agents, and hardening agents.

In some embodiments, the composition has a pH of at least 7, at least 8, at least 9, or at least 10; and less than 14, less than 13, less than 12, or less than 11. In some embodiments the pH is between about 7 to about 14, about 8 to about 12, or about 9 to about 11. In certain embodiments the composition is formulated for uses where it may incidentally come into contact with skin, and may be formulated to have a pH of about 5 to about 10, about 7 to about 9, about 8 to about 9, about 9 to about 10, or about 8.5 to about 10.7. Examples of such compositions include general purpose cleaners, dish washing detergents, floor cleaners, and degreasers. In some other embodiments, a stronger formulation is desired, and the composition is formulated to have a pH of about 9 to about 14, about 10 to about 13, or about 11 to about 13. Examples of such compositions include degreasers and floor finish cleaners/conditioners.

If the amino acid has two amino groups, it may be desirable that the pKa of both amino groups is above the pH of the composition. In one preferred cleaner embodiment, the pH of the composition is below the α and ε amine pKa. The formula pH can also be set between the two amine pKas. In some embodiments the pH of the composition is above the pH of the α amine group. Generally the pH of the composition will be above the pKa of the carboxylic acid group or groups. The formula pH will determine the charge on the amino acid. In other words, the charge on the amino acid can be set by adjusting formula pH. The amino acid can be selected based on its pKas. For example, the pKa of the ε amino group in lysine is about 10.7, and in arginine about 12.1. In some embodiments where lysine is the amino acid, the pH may be above the α amine, but below the ε amine group, or the pH of the composition may be above both amine pKas. In some cases the formula pH will be above the isoelectric point of the amino acid.

The composition may comprise one or more pH modifiers. Examples of pH modifiers include acids, such as organic acids (e.g., carboxylic acids) or inorganic acids (e.g., hydrochloric acid, phosphoric acid, etc.) and bases, such as alkali metal hydroxides. The amino acids can also be used as pH modifiers in the composition. In one embodiment, one or more amino acids of the composition have a positively charged (basic) side chain, and can be used to neutralize acidic components. For example, the amino acids can be used to neutralize a synthetic anionic surfactant acid, such as a sulfate or sulfonate (e.g., DDBSA), or to neutralize fatty acids to create an amino soap. In some instances it may be preferable to limit or avoid the use of fatty acids or alkyl carboxylates (soaps) in the composition. For example, the composition may include magnesium, a water harness ion, which could form insoluble soap residues with the fatty acids and alkyl carboxylates. In such cases, the amino acid and alkyl carboxylate can be present at a molar ratio of at least 1.2 parts amino acid for every 1 part alkyl carboxylate. The amino acids can sometimes be used in the absence of anionic surfactants, or carboxylate-type anionic surfactants to provide enhanced cleaning, soil penetration, or floor finish conditioning.

The composition may further comprise one or more buffers. Examples of buffers include phosphates, carbonates, amines, bicarbonates, and citrates. Exemplary phosphates include anhydrous mono-, di-, or trisodium phosphate, sodium tripolyphosphate, tetrasodium pyrophosphate and tetrapotassium pyrophosphate. Exemplary carbonates include sodium carbonate, potassium carbonate, and sesquicarbonate. Exemplary citrates include sodium or potassium citrate. Exemplary amines include urea and morpholine. Some buffers also sequester or precipitate water hardness ions, functioning as detergent builders.

Hydrotropes can be included in compositions to aid in compositional stability and to help solubilize other components in aqueous formulations by coupling with the other components. According to an embodiment, the composition comprises one or more hydrotropes. Any hydrotrope coupler may be used provided it does not react with the other components of the composition or negatively affect the performance properties of the composition. Suitable hydrotropes include, for example, alkyl sulfates and alkane sulfonates, linear alkyl benzene or naphthalene sulfonates, short chain linear alkyl benzene, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and C4-C10 alkyl glucosides.

Preferred hydrotropes include n-octanesulfonate, available as NAS 8D from Ecolab Inc., in St. Paul, MN; n-octyl dimethylamine oxide; commonly available aromatic sulfonates such as alkyl benzene sulfonates (e.g. xylene sulfonates) or naphthalene sulfonates; and aryl or alkaryl phosphate esters or their alkoxylated analogues having 1 to about 40 ethylene, propylene or butylene oxide units. Other preferred hydrotropes include nonionic surfactants of $C_6$-$C_{24}$ alcohol alkoxylates (ethoxylates, propoxylates, or butoxylates); $C_6$-$C_{24}$ alkylphenol alkoxylates; $C_6$-$C_{24}$ alkylpolyglycosides; $C_6$-$C_{24}$ fatty acid ester ethoxylates, propoxylates or glycerides; and $C_4$-$C_{12}$ mono or dialkanolamides. In some embodiments, the hydrotrope is selected from sodium alkylnaphthalene sulfonate, sodium xylene sulfonate, and mixtures thereof.

The composition may comprise about 0 to about 15 wt-%, or about 0.1 to about 12 wt-%, or about 0.5 to about 10 wt-%, or about 1.0 to about 8 wt-%, or about 2.0 to about 5.0 wt-% of hydrotropes. According to an exemplary embodiment, the composition comprises about 1.5-4.0 wt-% of hydrotropes. According to a further exemplary embodiment, the composition comprises about 1.5-3.0 wt-% of sodium xylene sulfonate.

The compositions may include one or more builders that can be used to stabilize the composition or solution and boost cleaning. Builders include chelating agents (chelators), sequestering agents (sequestrants), detergents, and the like. Traditional builders include phosphates, polyphosphates, chelating agents, and may include silicates, carbonates and even inorganic sulfates. Traditional builders are anionic, such as phosphates, polyphosphates, aminocarboxylates, silicates, and the like. One primary purpose of traditional detergent builders is to sequester, complex, or chelate polyvalent cations.

Preferred builders are water soluble. Examples of suitable builders include phosphonic acids and phosphonates, phosphates, aminocarboxylates and their derivatives, pyrophosphates, polyphosphates (e.g., tripotassium polyphosphate "TKPP"), ethylenediamine and ethylenetriamine derivatives, hydroxyacids, and mono-, di-, and tri-carboxylates and their corresponding acids, polyacrylic acid and its salts, phosphonobutane carboxylic acid, and sodium gluconate. Other builders include aluminosilicates, nitroloacetates and their derivatives, and mixtures thereof. Still other builders include aminocarboxylates, including salts of ethylenediaminetetraacetic acid (EDTA), hydroxyethylenediaminetetraacetic acid (HEDTA), diethylenetriaininepentaacetic acid, glutamic acid diacetic acid (GLDA), such as DISSOLVINE® GL available from AkzoNobel N.V., and methylglycinediacetic acid (MGDA), such as TRILON® M available from BASF Corp. In some embodiments, the composition is free or substantially free of builder.

Compositions may also contain an effective amount of divalent magnesium salts. Magnesium salts can also perform as builders, but are not traditional builders. Examples of suitable magnesium compounds include $MgCl_2$, MgO, and $Mg(OH)_2$. Magnesium ions may enhance the functionality of certain anionic surfactants. If the magnesium is provided as an oxide or hydroxide, it can also contribute to neutralizing acidic components (e.g., alkyl benzene sulfonic acid) in the composition.

The composition may comprise about 0.05 to about 20 wt-%, about 0.1 to about 5 wt-%, about 0.2 to about 4 wt-%, about 0.3 to about 3 wt-%, or about 0.5 to about 2 wt-% of a builder. If the composition comprises magnesium, the magnesium may be included at 1 part or less of magnesium for every 1 part of anionic (or amphoteric) surfactant on a molar basis, or at 0.5 parts or less of magnesium for every 1 part of anionic (or amphoteric) surfactant on a molar basis. For example, the composition may include about 0.2 to about 4 wt-%, or about 0.3 to about 2.0 wt-% of a magnesium salt. A use solution may include about 0.02 to about 0.4 wt-%, or about 0.03 to about 0.2 wt-% of a magnesium salt. Suitable magnesium salts include any magnesium salts that are sufficiently soluble in water, such as $MgCl_2$, $Mg(NO_3)_2$, $MgSO_4$, etc. In some embodiments the composition comprises magnesium above levels found incidentally in process water. In embodiments where the composition contains magnesium and an anionic surfactant, the composition is preferably free of anionic detergent builders, including those capable of precipitating, complexing, or chelating magnesium.

Compositions formulated as solids may include fillers, solidifying agents, and hardening agents.

According to embodiments, the composition may comprise one or more solvents. The composition includes from 10 to 99 wt-%, 30 to 95 wt-%, or 50 to 90 wt-% solvent. In a preferred embodiment, the solvent is water. The composition can be formulated either as a concentrate, comprising little water (e.g., about 10-70 wt-%), or as a use solution, where water comprises the majority of the composition (e.g., about 50 to 99 wt-% water). A concentrate may be diluted by the user with water or another suitable solvent. For example, the concentrate composition can be formulated with 10 to 50 wt-% water, and be diluted prior to use with water at a ratio of about 0.5 to 10 ounces of concentrate per gallon of water.

In some embodiments, the use solution (a composition either formulated as a use solution, or a use solution prepared from a concentrate) comprises about 40 to about 99 wt-%, or about 70 to about 95 wt-%, or about 80 to about 90 wt-% water. In an exemplary embodiment, the use solution comprises about 75 to about 95 wt-% water.

The formula can also contain organic solvents such as glycol ethers, propylene glycol, or ethylene glycol series glycol ethers may be used, for example diethylene glycol monobutyl ether, or tripropylene glycol butyl ether. In embodiments where organic solvents are included in a composition in addition to water, the organic solvents are included in an amount of from 0.2 to 40 wt-%, 0.5 to 20 wt-%, or 1 to 10 wt-%.

Exemplary formulations of a concentrate composition are shown in TABLE 1A and of a use solution in TABLE 1B below. However, any of the concentrates in TABLE 1A can be diluted to make a use solution, even if not presented in TABLE 1B. The resulting concentration ranges can be calculated using a dilution ratio of about 1:1, about 1:5, about 1:10, about 1:25, about 1:50, about 1:100, about 1:250, or about 1:1000. In some embodiments, about 0.1 to 50 wt-% of cleaning concentrate is combined with about 50 to about 99.9 wt-% water to form a use solution. The use composition can also be formed with 0.4 to 20 wt-% concentrate and 80 to 99.6 wt-% water, 1 to 10 wt-% concentrate and 90 to 99 wt-% water, or 2 to 4 wt-% concentrate and 96 to 98 wt-% water.

TABLE 1A

Exemplary Concentrate Formulations

| Formula | Water | Amino acid | Surfactant | Hydrotrope | Builder | Other components | pH |
|---|---|---|---|---|---|---|---|
| General (wt-%) | 50-99 | 5-30 | 0.1-30 | 0-30 | 0-10 | Balance | 5-13.5 |
| A (wt-%) | Water 76-80 | Lysine hydrochl. 10-12 | Nonionic Surfactant 1-5 | Hydrotrope 1-5 | NaOH 0.1-3 | Fragrance, Dye 0 | 7-10.5 |
| B (wt-%) | Water 72-78 | Lysine hydrochl. 14-18 | Alcohol Alkoxylate 0.5-4 | Sodium Xylene Sulfonate 3-7 | $Na_2CO_3$ 0.5-10 | Fragrance, Dye 0.1-0.5 | 9-10.5 |
| C (wt-%) | Water 73-78 | Arginine 16-20 | Nonionic Surfactant 0.5-5 | Hydrotrope 4-8 | NaOH 0-6 | Fragrance, Dye 0-0.4 | 7-12 |
| D (wt-%) | Water 75-81 | Arginine 10-14 | Alcohol Alkoxylate 1-5 | Sodium Xylene Sulfonate 3-8 | KOH 0-8 | Fragrance, Dye, Glycol Ether DB 0.1-10 | 9-12 |

TABLE 1A-continued

Exemplary Concentrate Formulations

| Formula | Water | Amino acid | Surfactant | Hydrotrope | Builder | Other components | pH |
|---|---|---|---|---|---|---|---|
| E (wt-%) | Water 75 | Lysine, basic 16 | DDBSA 8 | Sodium Xylene Sulfonate 6 | NaOH 0-5 | Fragrance, Dye 0.2 | 7-10.5 |
| F (wt-%) | Water 72-90 | Lysine, basic 1-10 | DDBSA 2-6 | Co-surfactant 0-10 | — | Fragrance, Dye 0-2 | 10.8-13.5 |
| G (wt-%) | Water 72-90 | Lysine, basic 1-10 | Amine Oxide 3-10 | Co-surfactant 0-10 | None | Fragrance, Dye 0-2 | 5-9 |
| H (wt-%) | Water 72-90 | Lysine hydrochl. 1-10 | Nonionic Surfactant 5-10 | Co-surfactant 0-10 | Sodium meta silicate 0.2-6 | Fragrance, Dye 0-2 | 9.5-10.5 |
| I (wt-%) | Water 50-66 | Lysine, basic 6-24 | DDBSA 1-5 | Sodium Xylene Sulfonate 2-8 | — | Fragrance, Dye, benzyl alcohol, MgCl 4-12 | 8-12 |

TABLE 1B

Exemplary Use Solution Formulations

| Formulation | Water | Amino acid | Surfactant | Hydrotrope | Other components |
|---|---|---|---|---|---|
| General Use Solution (wt-%) | 85-99.99 | 0.1-8 | 0.1-5 | 0-2 | Balance |
| J (wt-%) | Water 97-99.6 | Lysine 0.1-1 | Anionic Surfactant 0.3-1.5 | Co-surfactant 0-1 | Fragrance, Dye 0-0.2 |
| K (wt-%) | Water 95-99.9 | Lysine 0.1-1 | Amine Oxide 0.3-1.5 | Co-surfactant 0-1 | Fragrance, Dye 0-0.2 |
| L (wt-%) | Water 88-99.2 | Arginine 0.5-8 | Alcohol Alkoxylate C10 0.3-3 | Hydrotrope 0-1 | Fragrance, Dye 0-0.2 |
| M (wt-%) | Water 88-99.2 | Lysine 0.5-8 | Alcohol Alkoxylate C10 0.1-1 | Sodium Xylene Sulfonate 0-1 | Fragrance, Dye 0-0.2 |

In some embodiments, the composition is provided as a ready-to-use solution comprising about 90 to about 98 wt-% water; about 0.1 to about 5, about 0.1 to about 3, or about 0.2 to about 1 wt-% amino acid; about 0.1 to about 5, about 0.2 to about 4, or about 0.2 to about 3 wt-% surfactant; and optionally 0 to about 4 or about 0.2 to about 3 wt-% other components including hydrotropes, builders, pH adjusting agents, enzymes, chelating agents, organic solvents, sanitizers, antimicrobial agents, magnesium, dyes, fragrances, rheological, preservatives, processing aids, corrosion inhibitors, or other functional ingredients.

In some preferred embodiments, when the composition is formulated as a general purpose cleaner, the composition comprises water, amino acid (e.g., lysine), surfactant, and an optional magnesium. In a use solution of general purpose cleaner, the amino acid is present at from 0.1 to 8 wt-%, 0.5 to 5 wt-%, or 1 to 3 wt-%. The surfactant is present at from 0.1 to 5 wt-%, 0.25 to 3 wt-%, or 0.5 to 1.5 wt-%. The optional magnesium is present in the general purpose cleaner use solution at from 0.02 to 0.4 wt-%, 0.05 to 0.3 wt-%, or 0.08 to 2 wt-%. The use solution may be formed by combining a concentrate with water or other suitable solvent. The composition may be free of free fatty acids and alkyl carboxylates. The composition may also be free of builder. In some embodiments, the surfactant is preferably an anionic surfactant such as a sulfonate. In some embodiments that amino acid is lysine, arginine, or glycine, or a combination thereof.

In some embodiments, the composition is formulated for use as a floor cleaner, or as a floor polish conditioner. Acrylic floor finishes or polishes are particularly used in public spaces, such as retailer stores and other businesses, educational institutions, restaurants, health care facilities, long-term care facilities, etc. Examples of commercially available acrylic floor polishes include GEMSTAR™ LASER™ and MARKETSTAR by Ecolab Inc. in St. Paul, MN, and SIGNATURE® by Sealed Air Diversey Care in Sturtevant, WI. Maintenance of floors finished with acrylic floor finishes is typically done with floor cleaning machines and may include either (1) scrubbing the floor with a cleaning composition and burnishing the floor to polish; (2) scrubbing the floor with a cleaning composition and recoating, particularly if soil has penetrated into the finish or the finish has worn unevenly in high traffic areas; or (3) scrubbing with aggressive chemicals to remove the existing finish and refinishing the floor. Cleaning compositions with alkanolamines are typically used in options (1) and (2), where cleaning and softening of the floor finish is desired. An example of a commercially available cleaning composition is MAXX Dual Action available from Ecolab Inc.

Certain types of floor cleaners used on polished floor materials are used to prepare the floor polish for buffing or burnishing. These cleaners are sometimes referred to as polish preparation cleaners or cleaner conditioners, and often comprise alkaline compositions with surfactants and alkanolamines (e.g., MEA and/or ammonia). The polish-preparation cleaners can be used to soften the floor finish to make polishing more effective. Such cleaner can also be used prior to scrubbing and recoating floors to ensure a clean surface prior to subsequent treatment. The compositions of the present disclosure can be formulated for use as polish preparation cleaners.

In some preferred embodiments, when the composition is formulated as a floor cleaner conditioner, the composition comprises water, amino acid (e.g., lysine), and a surfactant (e.g., a low-foaming surfactant, or a surfactant and a defoamer), and has a pH above 7, above 9, or above 10. In a concentrate floor cleaner conditioner, the composition includes from 6 to 30 wt-% 8 to 25 wt-%, or 10 to 20 wt-% amino acids. A surfactant is present at from 2 to 10 wt-%, 3 to 8 wt-% or 4 to 6 wt-%. In some embodiments the surfactant is a nonionic surfactant. In some embodiments the floor cleaner composition further includes a co-surfactant. In some embodiments that amino acid is lysine, arginine, or glycine, or a combination thereof.

In other embodiments, the composition is formulated as a degreaser and comprises water, amino acid, one or more solvents with alcohol functionality (e.g., solvents that are at soluble in water at concentrations at or above 0.2 wt-%, such as benzyl alcohol and glycol ether), surfactants, and optionally alkali. The pH of a degreaser can be from 6 to 14, or from 9 to 14. In some embodiments, a degreaser includes water, benzyl alcohol, amino acid (e.g., lysine), dodecylbenzene sulfonic acid (DDBSA), and a sulfonate (e.g., sodium xylene sulfonate). A use solution of degreaser includes from 6 to 24 wt-%, 8 to 20 wt-%, or 10 to 16 wt-% amino acids. A surfactant is present at from 1 to 5 wt-%, 1.5 to 4 wt-%, or 2 to 3 wt-%. The degreaser solution includes from 2 to 8 wt-%, 3 to 7 wt-%, or 4 to 6 wt-% hydrotrope. From 4 to 8 wt-%, 4.5 to 7 wt-%, or 5 to 6 wt-% solvent is included in the degreaser. The degreaser can also include water in the use solution. In some embodiments, the surfactant is an anionic surfactant. In some embodiments, the hydrotrope is also an anionic surfactant. In some embodiments, the surfactant can be selected to have both surfactant and hydrotropic properties. In some embodiments that amino acid is lysine, arginine, or glycine, or a combination thereof.

When the composition is formulated as a concentrate, the composition may comprise about 1 to 60 wt-%, about 2 to 30 wt-%, or about 2 to 10 wt-% of amino acids. For example, the concentrate composition may comprise about 5 wt-%, about 8 wt-%, about 10 wt-%, about 12 wt-%, about 15 wt-%, about 18 wt-%, or about 20 wt-% of amino acids. In certain embodiments, the concentrate composition is intended for use as a general purpose cleaner or a manual dish washing detergent and comprises about 0.5 to about 12 wt-%, about 1 to about 10 wt-%, or about 3 to about 7 wt-% amino acid. In some other embodiments, the concentrate composition is intended for use in floor cleaning or conditioning, and comprises about 4 to 60 wt-%, about 6 to 30 wt-%, about 8 to 20 wt-%, about 12 to 30 wt-%, about 14 to 25 wt-%, or about 15 to 20 wt-% of amino acids. In some embodiments, the concentrate composition is intended for use as a degreaser and comprises about 5 to 25 wt-%, about 8 to 16 wt-%, or about 23 to 25 wt-% of amino acids. In some embodiments that amino acid is lysine, arginine, or glycine, or a combination thereof.

METHOD OF USE

According to embodiments, the compositions of the present disclosure can be used to clean surfaces, such as floors, equipment (e.g., food and beverage processing equipment, grain processing equipment, and the like), food preparation surfaces (e.g., counter tops and other surfaces), and other hard surfaces. The composition can be used as a general purpose cleaner, as a degreaser, or as a floor cleaner. The compositions can be effective at removing grease, from floors and other surfaces. The compositions can be effective at cleaning floors treated with an acrylic-based polish.

In one embodiment the formula contains an anionic sulfonate, or sulfate surfactant, lysine and magnesium.

The composition may be provided as a concentrate or as a use solution. A concentrate composition may be diluted to form a use solution prior to use with a suitable diluent, such as water or another aqueous solution. In some embodiments, a concentrate composition is diluted about 1:1, about 1:5, about 1:10, about 1:25, about 1:50, about 1:100, or about 1:1000 to prepare a use solution. In certain embodiments, the use solution is prepared by diluting 0.5 oz of concentrate with 1 gal of water, resulting in a dilution ratio of about 1:250. The dilution rate can be adjusted based on intended use, such that a more dilute use solution can be prepared for daily use, and a more concentrated use solution for spot treatment or deep cleaning. For example, a more dilute use solution can be used to clean vinyl floors, while a concentrated use solution can be used to condition and re-polish floors.

The composition can be applied to the surface by any suitable method, such as pouring, spraying, mopping, with a rag, or by using a floor cleaning or floor treatment machine. The composition can be allowed to remain on the surface for a length of time, such as about 1 second to 30 minutes, about 1 minute to 25 minutes, about 5 to 20 minutes, or about 10 to 15 minutes. The length of time can be adjusted to be longer or shorter depending on various parameters, such as on the amount and type of dirt that is being removed, or whether a previous surface treatment is being softened or removed. The surface can then be wiped clean or scrubbed either manually or with the help of a floor cleaning machine. The surface can optionally be rinsed after the treatment to remove any trace amounts of the composition. When the composition is used on a floor with a floor finish or floor polish, after treatment with the composition the floor can be burnished or refinished.

The compositions of the present disclosure can be formulated for use as polish preparation cleaners that soften the floor finish to make polishing of the floor finish more effective, or that can be used prior to scrubbing and recoating floors to ensure a clean surface prior to subsequent surface treatment. In some embodiments, the compositions aid in softening floor finish to facilitate stripping and removal.

EXAMPLES

Example 1

Floor treatment compositions according to embodiments were tested and compared to a commercially available cleaning composition (MAXX Dual Action) by applying each of the compositions to a test floor tile using conventional methods. The test floor tiles were finished with GEMSTAR LASER floor finish. The products were applied to the floor by mopping to flood the surface. The contact time was 10 minutes. The floor tiles were scrubbed with a floor care machine. Three days later the floor tiles were recoated using GEMSTAR STRATUS™. The gloss (reflectance) of the surface was measured before treatment, after scrubbing, and after recoating using a BYK GARDNER micro-TRI-gloss gloss meter (available from Altana AG in Wesel, Germany). The gloss was recorded at 20°, 60°, and 85°. The color of the test floor tiles varied (blue, black, or white) and was recorded in the results table.

| Chemicals: | Available from: |
|---|---|
| GEMSTAR LASER | Ecolab Inc. in St. Paul, MN |
| GEMSTAR STRATUS | Ecolab Inc. |
| MAXX Dual Action | Ecolab Inc. |
| Alxohol alkoxylate, C10 (LUTENSOL XP 80) | BASF Corp. in Florham Park, NJ |
| L-lysine | |
| Sodium Xylene Sulfonate, 40% | |
| Fragrance | |
| Dye | |
| Water, zeolite softened | |

The tested formulations and the comparative composition (MAXX Dual Action, "MDA") were diluted with water at 1 oz/gal. The tested formulations are shown in TABLE 2. The concentrations are shown before dilution.

TABLE 2

Tested Formulations

| Component | C1 (wt-%) | C2 (wt-%) | C3 (wt-%) | C4 (wt-%) |
|---|---|---|---|---|
| Surfactant (Alcohol Alkoxylate C10) | 2.2 | 2.2 | 2.2 | 2.2 |
| Hydrotrope (Sodium Xylene Sulfonate) | 6.0 | 6.0 | 6.0 | 6.0 |
| Fragrance | 0.13 | 0.13 | 0.13 | 0.13 |
| Dye | 0.04 | 0.04 | 0.04 | 0.04 |
| Lysine | 10 | 16 | 18 | 20 |
| Water | 81.63 | 75.63 | 73.63 | 71.63 |

The results of the study are shown in TABLE 3. In evaluating the various treatments, the gloss readings of the scrubbed floor at 60° may be most indicative of efficacy. The lower the gloss reading, the more effective the composition was.

TABLE 3

Gloss Comparison

| | | | Gloss 20° | | Gloss 60° | | Gloss 85° | |
|---|---|---|---|---|---|---|---|---|
| | Reference | Tile Color | Mean | StDev | Mean | StDev | Mean | StDev |
| Initial Gloss | MDA | Blue | 31.8 | 3.6 | 73.9 | 3.1 | 80.0 | 2.4 |
| | MDA | Black | 24.5 | 2.7 | 67.2 | 2.4 | 73.8 | 2.2 |
| | C1 | Blue | 38.5 | 6.5 | 79.0 | 5.1 | 86.4 | 5.2 |
| | C1 | Black | 31.8 | 3.6 | 73.9 | 2.7 | 82.0 | 1.5 |
| | C2 | Blue | 33.8 | 5.7 | 75.2 | 4.0 | 84.4 | 3.8 |
| | C2 | Black | 21.8 | 1.7 | 64.0 | 3.0 | 72.0 | 3.9 |
| | C3 | Blue | 24.1 | 9.1 | 64.0 | 9.4 | 72.6 | 9.8 |
| | C3 | White | 26.5 | 4.9 | 69.5 | 4.9 | 77.0 | 4.2 |
| | C4 | Blue | 26.6 | 6.5 | 67.4 | 6.3 | 75.0 | 6.4 |
| | C4 | White | 28.5 | 3.4 | 72.2 | 3.7 | 77.6 | 5.3 |
| Scrubbed Gloss | MDA | Blue | 1.0 | 0.2 | 6.4 | 0.6 | 43.3 | 3.1 |
| | MDA | Black | 0.7 | 0.1 | 7.3 | 1.5 | 47.7 | 3.5 |
| | C1 | Blue | 0.9 | 0.4 | 6.3 | 0.5 | 35.5 | 3.9 |
| | C1 | Black | 0.6 | 0.1 | 5.5 | 0.4 | 35.2 | 4.1 |
| | C2 | Blue | 0.6 | 0.1 | 5.5 | 0.5 | 32.1 | 2.6 |
| | C2 | Black | 0.5 | 0.1 | 5.6 | 0.6 | 34.7 | 2.1 |
| | C3 | Blue | 0.6 | 0.1 | 6.1 | 2.2 | 36.1 | 7.8 |
| | C3 | White | 1.3 | 0.1 | 6.0 | 0.6 | 30.9 | 1.6 |
| | C4 | Blue | 0.6 | 0.1 | 4.8 | 0.4 | 34.4 | 1.9 |
| | C4 | White | 1.1 | 0.1 | 5.5 | 0.7 | 30.4 | 1.7 |
| Recoat Gloss | MDA | Blue | 50.9 | 10.0 | 85.6 | 7.4 | 95.7 | 1.4 |
| | MDA | Black | 54.9 | 7.9 | 89.0 | 2.6 | 96.1 | 1.0 |
| | C1 | Blue | 48.5 | 2.6 | 87.3 | 2.6 | 94.9 | 1.7 |
| | C1 | Black | 47.5 | 5.5 | 85.1 | 4.3 | 94.5 | 1.2 |
| | C2 | Blue | 40.2 | 3.0 | 85.6 | 2.6 | 94.3 | 1.3 |
| | C2 | Black | 42.7 | 5.9 | 84.2 | 4.4 | 93.7 | 1.7 |
| | C3 | Blue | 46.4 | 7.0 | 86.1 | 4.3 | 94.4 | 2.5 |
| | C3 | White | 48.9 | 5.4 | 88.0 | 3.9 | 93.7 | 1.7 |
| | C4 | Blue | 48.9 | 4.7 | 85.6 | 2.5 | 93.6 | 0.7 |
| | C4 | White | 52.3 | 6.5 | 90.3 | 2.0 | 95.5 | 1.4 |

TABLE 4 is a sub-section of TABLE 3, showing the 60° gloss values for scrubbed blue tiles only. This sub-set of data was considered the representative of the effectiveness of the composition.

TABLE 4

Gloss Comparison

| | | | Gloss 60° | |
|---|---|---|---|---|
| | | Tile Color | Mean | StDev |
| Scrubbed Gloss | MDA | Blue | 6.4 | 0.6 |
| | 10 wt-% Lysine | Blue | 6.3 | 0.5 |
| | 16 wt-% Lysine | Blue | 5.5 | 0.5 |

TABLE 4-continued

Gloss Comparison

| | Tile Color | Gloss 60° Mean | StDev |
|---|---|---|---|
| 18 wt-% Lysine | Blue | 6.1 | 2.2 |
| 20 wt-% Lysine | Blue | 4.8 | 0.4 |

It was observed that the composition containing lysine was at least as effective as the commercially available product. It was further observed that higher lysine contents were more effective. It was concluded that optimal results could be achieved with a lysine content of 16 wt-% or more.

Example 2

All-purpose cleaning compositions according to embodiments were prepared with various surfactants and with and without lysine. The cleaning efficacy of the compositions was tested and compared to a commercially available cleaner (OASIS 137 ORANGE FORCE™ available from Ecolab) and to water for the removal of black soil from vinyl tiles. OASIS 137 ORANGE FORCE™ contains a mixture of surfactants and an amine (triethanolamine).

Compositions 1A, 1B, 2A, 2B, 3A, 3B, 4A, and 5B were prepared according to TABLE 5. For each composition, variant "A" was prepared without lysine and variant "B" was prepared with lysine. The compositions were diluted with 5 grain water at 8 oz per gallon and at 16 oz per gallon. The pH of the diluted compositions was adjusted to between 8.8 and 8.95 with NaOH and/or HCl. The %-active of the surfactants varied from 30 wt-% to 100 wt-%. The compositions were prepared so that the total %-active of surfactants in each composition was 10 wt-%.

| Chemicals: | Available from: |
|---|---|
| OASIS 137 ORANGE FORCE ™ | Ecolab Inc. |
| C12/14 Alkyl polyglycoside (GLUCOPON ® 625), 50% | BASF Corporation |
| C11 linear alcohol ethoxylate 5 moles EO (TOMADOL ® 1-5), 100% | Air Products and Chemicals, Inc. in Allentown, PA |
| C11 linear alcohol ethoxylate 7 moles EO (TOMADOL ® 1-7), 100% | Air Products and Chemicals, Inc. |
| Lauryl dimethyl amine oxide (BARLOX ® 12), 30% | Lonza Group Ltd in Allendale, NJ |
| Cocamidopropyl betaine, 30% | Solvay Novecare |
| NaLAS 60%, Sodium dodecylbenzene sulfonate, 60% | Stepan Company |
| Lysine HCl, 98.5% | Archer Daniels Midland Co. |
| Water, 5 grain | |

TABLE 5

| | Compositions (units in wt-%) | | | | | | | | | |
|---|---|---|---|---|---|---|---|---|---|---|
| Chemical Name | 1A | 1B | 2A | 2B | 3A | 3B | 4A | 4B | 5A | 5B |
| Water, DI | 84.2 | 79.2 | 90 | 85 | 83.3 | 78.3 | 66.7 | 61.7 | 66.7 | 61.7 |
| Nonionic surfactants | | | | | | | | | | |
| GLUCOPON 625 | 5.0 | 5.0 | | | | | | | | |
| TOMADOL 1-5 | 2.5 | 2.5 | | | | | | | | |
| TOMADOL 1-7 | | | 10 | 10 | | | | | | |
| Amphoteric Surfactants | | | | | | | | | | |
| BARLOX 12 | | | | | | | 33.3 | 33.3 | | |
| Cocamidopropyl betaine | | | | | | | | | 33.3 | 33.3 |
| Anionic surfactants | | | | | | | | | | |
| NaLAS | 8.33 | 8.33 | | | 16.67 | 16.67 | | | | |
| Amino acid | | | | | | | | | | |
| Lysine HCl | | 5 | | 5 | | 5 | | 5 | | 5 |
| Total | 100 | 100 | 100 | 100 | 100 | 100 | 100 | 100 | 100 | 100 |
| pH | 9.3 | 9.3 | 9.3 | 9.3 | 9.3 | 9.3 | 9.3 | 9.3 | 9.3 | 9.3 |
| 8 oz/gal pH (initial/adjusted) | 8.12/8.84 | 9.21/8.88 | 7.92/8.91 | 9.11/8.93 | 7.75/8.90 | 9.35/8.91 | 8.58/8.85 | 9.04/8.93 | 8.62/8.85 | 9.16/8.90 |
| 16 oz/gal pH (initial/adjusted) | 8.59/8.90 | 9.13/8.93 | 7.93/8.86 | 9.19/8.93 | 7.78/8.86 | 9.30/8.92 | 8.88/8.84 | 9.16/8.91 | 8.82/8.85 | 9.01/8.92 |

The diluted compositions were used to clean soiled tile samples. The back-side (grooved side) of white vinyl tiles (size 3 inches square) were soiled with black soil (prepared with 50 g mineral spirits, 5 g mineral oil, 5 g motor oil, 2.5 g oil dag, and 37.5 g bandy black clay) using a 3-inch foam brush. The tiles were allowed to dry at room temperature overnight. The next day, the tiles were placed into a soaking tray containing about 200 g of cleaning composition for about 2 minutes.

The soil-removal test was conducted using a Gardco Washability and Wear tester and a cellulosic sponge (SCOTCH BRITE® multi-purpose sponge, available from 3M in St. Paul, MN). The sponge was pre-washed with water and dried, then saturated with about 80 g of test composition. The tiles were placed into a Gardco tray with the grain of the tiles parallel to the direction of sponge travel. The tiles were scrubbed with about 2 pounds of pressure with the moistened sponge for 40 cycles, rotating the tiles 90 degrees every 10 cycles for a complete 360° rotation of the tiles. The tiles were then rinsed with tap water and dried overnight at room temperature.

The color of the soiled tiles before and after washing was measured using Hunter Lab L* reflectance. The removal of soil from the tiles was calculated as %-soil removal as follows:

$$\% \text{ soil removal is } \left(\frac{\text{soiled } L'^* - \text{washed } L'^*}{\text{soiled } L'^*}\right) \times 100$$

Each composition was tested at two dilution rates (at 8 oz per gallon (6.25%), and at 16 oz per gallon (12.5%)) and in duplicate (noted as T-1 and T-2 in TABLE 6). The results are shown in TABLE 6 and FIG. 1.

TABLE 6

Results.

| Cleaner | Conc. (oz/gal) | Linear Percent Soil Removal | | | |
|---|---|---|---|---|---|
| | | T-1 Removal (%) | T-2 Removal (%) | Removal Mean (%) | Stdev |
| Oasis 137 | 8 | 48.68 | 48.19 | 48.44 | 0.35 |
| Oasis 137 | 16 | 52.15 | 48.01 | 50.08 | 2.93 |
| 1A | 8 | 43.96 | 44.47 | 44.22 | 0.36 |
| 1A | 16 | 50.74 | 46.93 | 48.83 | 2.69 |
| 1B | 8 | 46.99 | 52.52 | 49.75 | 3.91 |
| 1B | 16 | 53.52 | 53.21 | 53.36 | 0.22 |
| 2A | 8 | 43.50 | 39.58 | 41.54 | 2.78 |
| 2A | 16 | 43.74 | 43.99 | 43.87 | 0.18 |
| 2B | 8 | 40.75 | 42.95 | 41.85 | 1.56 |
| 2B | 16 | 44.72 | 46.23 | 45.48 | 1.06 |
| 3A | 8 | 50.82 | 50.94 | 50.88 | 0.08 |
| 3A | 16 | 48.70 | 49.96 | 49.33 | 0.89 |
| 3B | 8 | 64.53 | 54.22 | 59.37 | 7.29 |
| 3B | 16 | 53.70 | 54.43 | 54.06 | 0.52 |
| 4A | 8 | 39.29 | 36.90 | 38.09 | 1.69 |
| 4A | 16 | 45.01 | 40.13 | 42.57 | 3.45 |
| 4B | 8 | 43.13 | 43.50 | 43.32 | 0.26 |
| 4B | 16 | 46.66 | 43.35 | 45.01 | 2.34 |
| 5A | 8 | 35.07 | 34.84 | 34.96 | 0.16 |
| 5A | 16 | 38.62 | 44.07 | 41.35 | 3.85 |
| 5B | 8 | 38.31 | 39.46 | 38.88 | 0.81 |
| 5B | 16 | 41.29 | 38.86 | 40.07 | 1.72 |
| Water | — | 33.40 | 34.34 | 33.87 | 0.66 |

The increased cleaning efficacy (soil removal) of compositions with lysine ("B" compositions) as compared to compositions without lysine ("A" compositions) is shown in TABLE 7. The increase was calculated for each of the dilution rates separately and also as the average (mean) difference.

TABLE 7

Increase in Cleaning Efficacy Due to Lysine

| Composition | Surfactant type | Increase at 8 oz/gal | Increase at 16 oz/gal | Mean Increase |
|---|---|---|---|---|
| 1B-1A | Mixed | 5.54 | 4.53 | 5.03 |
| 2B-2A | Nonionic | 0.31 | 1.61 | 0.96 |
| 3B-3A | Anionic | 8.49 | 4.73 | 6.61 |
| 4B-4A | Amine Oxide | 5.22 | 2.44 | 3.83 |
| 5B-5A | Betaine | 3.93 | -1.27 | 1.33 |

It was observed that including lysine in the composition improved cleaning efficacy of all of the compositions. Further, the improvement was greater at the lower dilution rate (8 oz/gal) for all but nonionic surfactants. The cleaning efficacy of the betaine-based composition did not increase at the higher dilution rate (16 oz/gal). However, it was concluded that even when lysine does not provide improved cleaning efficacy, it can still be valuable for its buffering effect of the composition.

It was also observed that the performance of compositions 1A/1B (mixed surfactants) and 3A/3B (anionic sulfonate) compared well with the commercially available cleaner, and that addition of lysine (compositions 1B and 3B) caused the compositions to perform better than the commercially available cleaner. It was concluded that amino acids could be used as a replacement for amines (e.g., triethanolamine) in all-purpose cleaners. This is surprising because the amino acids do not contain the alcohol hydroxyl group present in the industry-standard alkanolamines. Also, they do contain a carboxylic acid group, which is not seen in commonly used amines.

Example 3

A general purpose cleaner was prepared using lysine as the amino acid, dodecylbenzene sulfonic acid (DDBSA) as the surfactant, and additional sodium hydroxide for pH adjustment. The formulation of the composition is shown in TABLE 8 below.

TABLE 8

General Purpose Cleaner

| Ingredient | Amount (wt-%) |
|---|---|
| Water | 76.31 |
| MgO | 0.76 |
| DDBSA | 14.88 |
| Lysine hydrochloride | 3.04 |
| Sodium xylene sulfonate (40%) | 4 |
| NaOH (50%) | 1.01 |
| TOTAL | 100 |

While certain embodiments of the invention have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:
1. A method of manually washing dishes comprising:
   (a) diluting a concentrate composition to form a use solution, the use solution consisting of:
      i. about 0.1 wt-% to about 8 wt-% of one or more amino acids selected from the group consisting of lysine, arginine, glycine, and combinations thereof;
      ii. about 0.1 wt-% to about 5 wt-% of one or more surfactants;
      iii. about 0.02 wt-% to about 0.4 wt-% of one or more magnesium salts;
      iv. water; and v. optionally one or more additional components selected from the group consisting of a chelating agent, a sequestering agent, a pH modifier, a hydrotrope, a builder, a dye, a fragrance, a rheology modifier, a preservative, a corrosion inhibitor, a filler, a solidifying agent, a hardening agent, an organic solvent, and combinations thereof, wherein the composition is free of alkanolamines; and (b) manually washing dishes in the use solution.

2. The method of claim 1, wherein the one or more amino acids is lysine.

3. The method of claim 1, wherein the one or more surfactants is selected from the group consisting of a nonionic surfactant, an anionic surfactant, an amphoteric surfactant, and combinations thereof.

4. The method of claim 1, wherein the one or more surfactants is selected from the group consisting of an alcohol alkoxylate, an amine oxide, sodium xylene sulfonate, linear alkylbenzene sulfonic acid, and combinations thereof.

5. The method of claim 1, wherein the water is present in the concentrate composition at about 10 wt-% to about 50 wt-%.

6. A manual dish washing composition consisting of comprising:
(a) about 1 to about 30 wt-% of one or more amino acids selected from the group consisting of lysine, arginine, glycine, and combinations thereof;
(b) about 0.1 to about 30 wt-% of one or more surfactants;
(c) one or more magnesium salts;
(d) water; and
(e) optionally one or more additional components selected from the group consisting of a chelating agent, a sequestering agent, a pH modifier, a hydrotrope, a builder, a sanitizer, an antimicrobial agent, an enzyme, a dye, a fragrance, a rheology modifier, a preservative, a corrosion inhibitor, a filler, a solidifying agent, a hardening agent, an organic solvent, and combinations thereof, wherein the composition is free of alkanolamines.

7. The composition of claim 6, wherein the one or more amino acids is lysine.

8. The composition of claim 6, wherein the one or more surfactants is selected from the group consisting of a nonionic surfactant, an anionic surfactant, an amphoteric surfactant, and combinations thereof.

9. The composition of claim 6, wherein the one or more surfactants is selected from the group consisting of an alcohol alkoxylate, an amine oxide, sodium xylene sulfonate, linear alkylbenzene sulfonic acid, and combinations thereof.

10. The composition of claim 6, wherein the one or more magnesium salts is present in the composition at about 0.2 wt-% to about 4 wt-%.

11. The composition of claim 6, wherein the water is present in the composition at about 10 to about 50 wt-%.

12. The composition of claim 6, comprising a pH of about 7 to about 9.

* * * * *